(12) United States Patent
Wright

(10) Patent No.: US 6,957,509 B2
(45) Date of Patent: Oct. 25, 2005

(54) ROTATING DIVING DECOY RIG

(76) Inventor: Bradley Russell Wright, 1900 Constitution Dr., St. Leonard, MD (US) 20685

( * ) Notice: Subject to any disclaimer, the term of this patent is extended or adjusted under 35 U.S.C. 154(b) by 0 days.

(21) Appl. No.: 10/236,314

(22) Filed: Sep. 9, 2002

(65) Prior Publication Data

US 2004/0045210 A1 Mar. 11, 2004

(51) Int. Cl.[7] ............................................. A01M 31/06
(52) U.S. Cl. ................................................... 43/3; 43/2
(58) Field of Search ............................... 43/2, 3; 446/4

(56) References Cited

U.S. PATENT DOCUMENTS

| | | | | | |
|---|---|---|---|---|---|
| 1,185,559 A | * | 5/1916 | Vaughan | ........................ | 369/63 |
| 1,376,282 A | * | 4/1921 | Kauffman | ........................ | 43/2 |
| 1,629,442 A | * | 5/1927 | Geisinger | ........................ | 43/3 |
| 1,836,504 A | * | 12/1931 | Prince | ........................ | 43/3 |
| 1,927,876 A | * | 9/1933 | Meyer | ........................ | 273/366 |
| 2,125,353 A | * | 8/1938 | Mattson | ........................ | 273/366 |
| 2,434,335 A | * | 1/1948 | Signalness | ........................ | 43/3 |
| 2,460,128 A | * | 1/1949 | Greenleaf | ........................ | 43/3 |
| 2,547,286 A | * | 4/1951 | Sabin | ........................ | 43/3 |
| 2,616,200 A | * | 11/1952 | Milam | ........................ | 43/3 |
| 2,793,456 A | * | 5/1957 | Argo | ........................ | 43/3 |
| 3,074,195 A | * | 1/1963 | Vanderpool | ........................ | 43/3 |
| 4,120,110 A | * | 10/1978 | Aeschliman | ........................ | 43/3 |
| 4,422,257 A | * | 12/1983 | McCrory | ........................ | 43/3 |
| 4,535,560 A | * | 8/1985 | O'Neil | ........................ | 43/3 |
| 5,074,071 A | * | 12/1991 | Dunne | ........................ | 43/3 |
| 5,566,491 A | * | 10/1996 | Phillips | ........................ | 43/3 |
| 6,442,885 B1 | * | 9/2002 | Payne | ........................ | 43/3 |

FOREIGN PATENT DOCUMENTS

GB 002189124 A * 10/1987 ..................... 43/2

* cited by examiner

Primary Examiner—Peter M. Poon
Assistant Examiner—David Parsley

(57) ABSTRACT

A decoy rig 100 is described having a number of individual decoys 102 deployed at intervals along the length of a shaft 104. The decoys 102 are deployed at an angle relative to the shaft 104 axis, and oriented around the shaft 104 diameter similar to the blades of a turbine rotor in relation to a turbine shaft. When driven by natural forces the anchor 110 holds decoy rig 100 in place against water or air flow inducing a differential pressure across the decoys 102 providing the motive force to rotate the decoy rig 100. In operation, the decoy rig 100 floats centered at or near the water surface and is moved by external forces such as wind, water current or tide, or may be mechanically driven thus causing 360 degree revolution movement by the individual decoys 102, effectively simulating the diving and feeding action of the decoy's live counterparts.

4 Claims, 5 Drawing Sheets

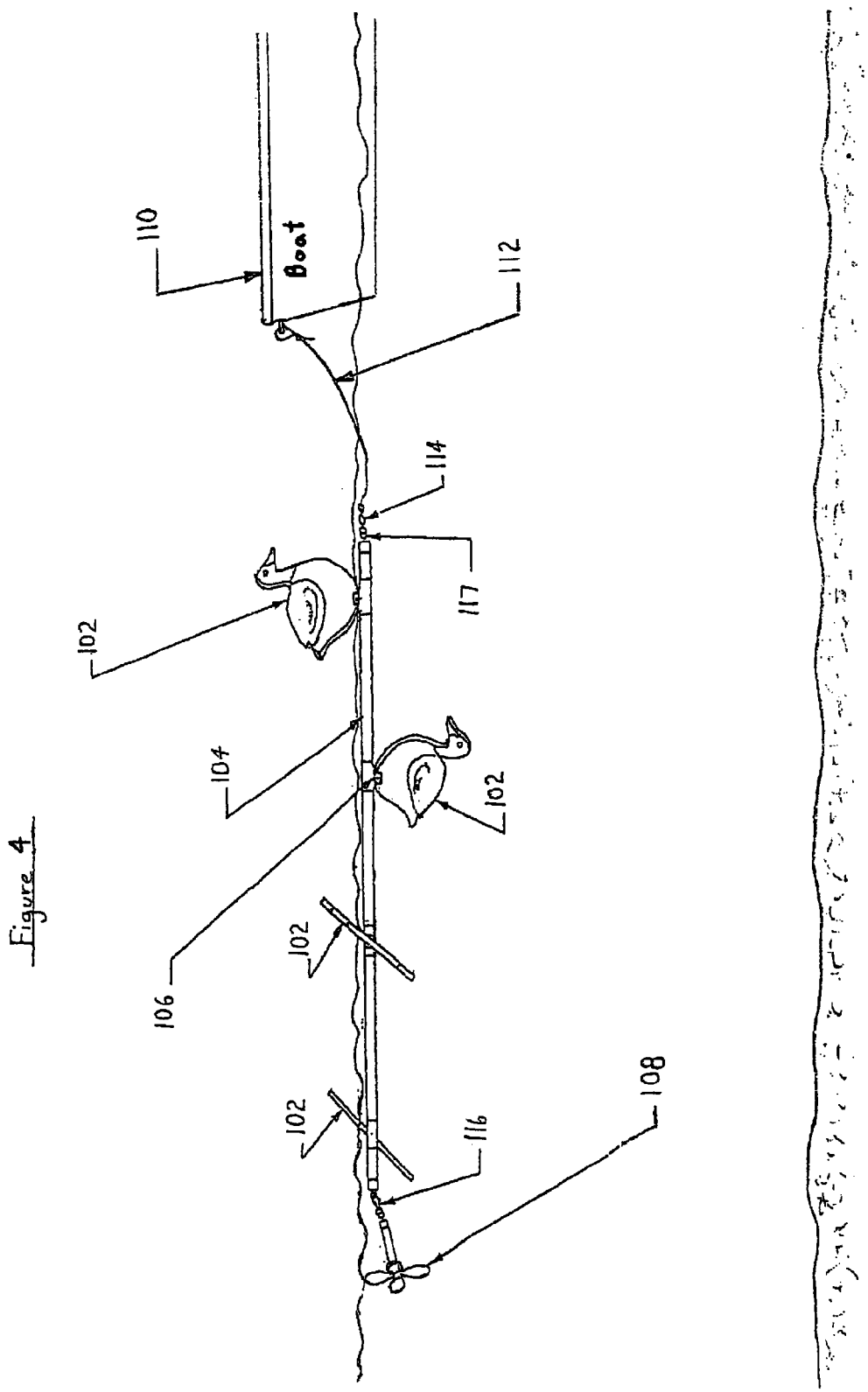

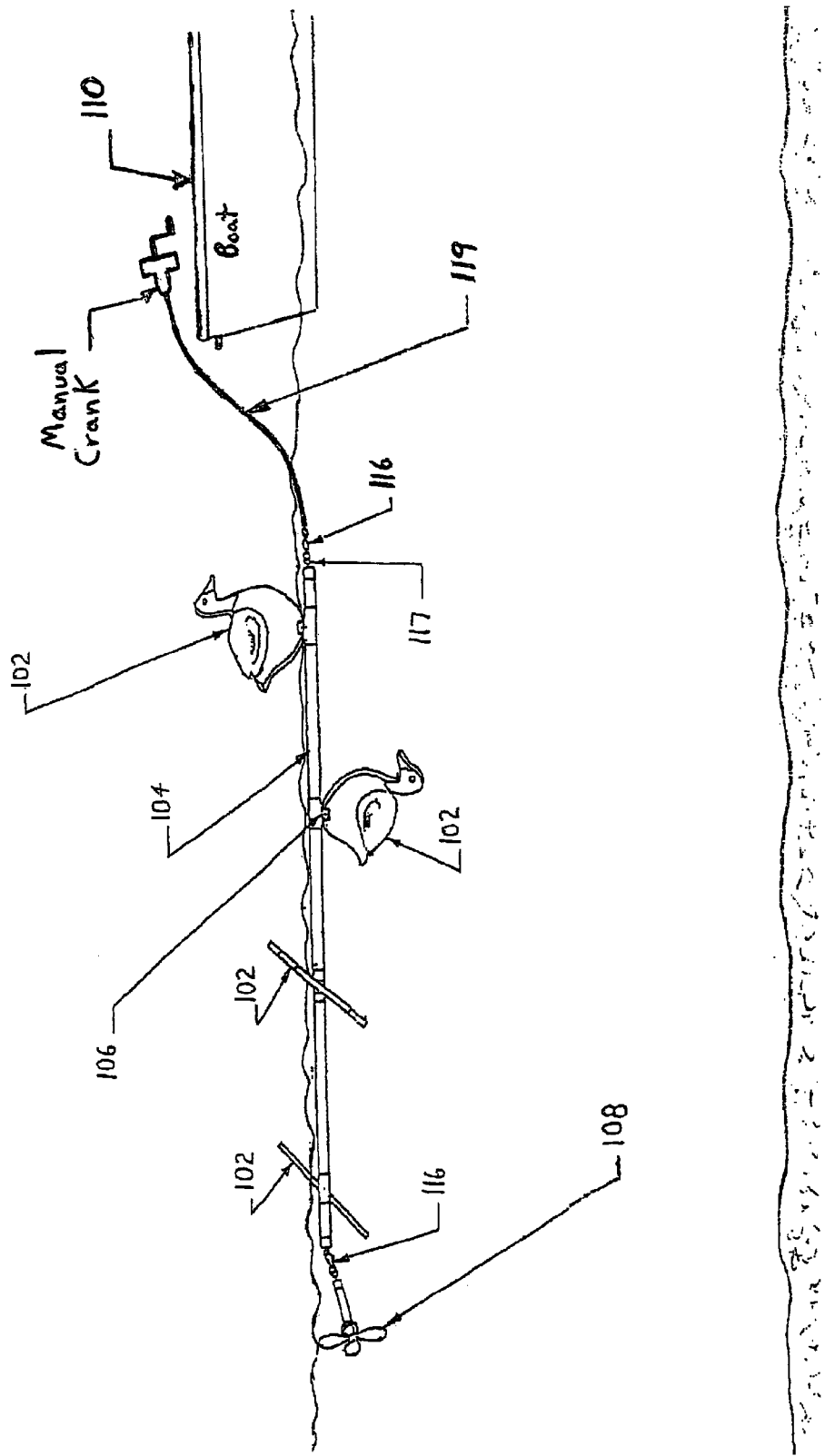

ROTATING DIVING DECOY RIG

The present invention relates to the general field of decoy configuration and specifically relates to a group of decoys, such as waterfowl, configured to rotate and dive, thus accurately simulate the natural motion of their live counter parts.

BACKGROUND OF INVENTION

Decoys have been used for years by hunters and other naturalist seeking to attract live animals such as waterfowl using artificial means. Various sporting good companies, such as Herter's, offer for sale a wide variety of such decoys ranging from silhouettes, to full-bodied decoys, to Wind socks. When in use, these decoys are often deployed in "spreads", meaning that a number of individual decoys are deployed together to simulate the gathering of a flock of waterfowl.

As the design and use of decoys has advanced over the years, decoys have been developed with various mechanical or electrical attributes to help the decoys simulate the motion of their live counterparts. The thought being that decoys in motion will be more realistic and thus more effective in attracting their targets than fixed or static decoys. Live waterfowl, such as ducks, for example, often land on the water in large flocks and dive into the water in search of food. Typical ways used to effect motion in decoys include the use of swinging pendulums attached to the base of the decoy to cause the decoy to rock, resulting in motion in not only the decoy, but also in the surrounding water. Decoys have also been provided with electrical or battery-powered motors that, when activated, vibrate to cause ripples around the decoy, spin wings to simulate flapping, move feet that splash, push the decoy through the water, or pull floating decoys below the water surface.

While such known motion decoys have been used for some time, known designs typically suffer from various drawbacks. From a construction perspective, such known designs are often complex, heavy, require a rigid bearing structure attached to the waters bottom under the decoys, or otherwise undesirable to the user who must deploy in the field.

Moreover, the use of the electrical supplements to cause decoy motion suffer not only from high costs, but also from exposure to the elements, such as saltwater, and short battery life made worse by cold weather, causing reduced life span of the decoys. From a performance viewpoint, known motion decoys designed to imitate the natural motion of their live counterparts, typically fail to do so. The existing motion decoys that do look natural, use ripples to do so, and are only effective on still water. In addition due to their bulk, cost of batteries, cost of each decoy, awkwardness to transport, it is impractical to use more than a few of these decoys in a spread.

An example of this is U.S. Pat. No. 6,442,885 issued to Kenneth William Payne September 2002, which causes floating decoys to bob under the water surface by running a string from the decoy to a crankshaft attached to poles and bearings rigidly attached to the bottom under the decoys, and driving the crank shaft with an electric motor also rigidly attached to the bottom. Although this may work under specific condition it is cumbersome, relies on a consistent shallow water depth with a soft bottom, and battery power motor.

Another U.S. Pat. No. 2,793,456 issued to R. D. ARGO in May 1957 caused floating decoys to bob on the water surface to simulate feeding ducks.

This consist of a frame rigidly attached to the bottom, a shaft with floating decoys strapped to it with a lever arm attached to a string that runs back to the blind where a hunter pulls the string each time he wants the decoys to bob. This suffers the same problems as the above referenced Patent by Payne except that hunter manually pulls activates the decoys.

SUMMARY OF THE INVENTION

To address the foregoing deficiencies in the prior art, the present invention is a rotating diving decoy rig which simulates the natural motion and action of its live counterparts and which is low in cost, simple in construction, and lasting in performance. More specifically, in accordance with present invention, there's provided a rotating diving decoy rig comprising a series of silhouette waterfowl decoys attached to a shaft at the bottom of each decoy. The decoys are distributed around the diameter and along the length of the shaft for balance, and at an angle to the axis of the shaft similar to the blades on a propeller or turbine. The rig floats freely at or near the surface of the water with approximate half of the decoys above and half below the surface.

It requires no rigid attachment or framework beneath the rig, will operate in water of any depth deeper than the height of a decoy making it user friendly where wind and tides cause water levels to rise fall, where water is deep, where bottoms are hard to sink poles into, and where quick easy relocation of the decoy spread is desirable. When the wind blows, the water flows, or the rig is pulled through the water, the rig rotates in a 360-degree pattern simulating a series of waterfowl diving.

The decoy rig essentially acts like a buoyant turbine rotor floating centered at or near the waters surface that converts linear force of wind and or water motion to rotation and diving action of the decoys. The decoys act as the blades of the turbine. If the tide or water flow is against the wind, a booster propeller that is preferably about neutral buoyancy can be attached to the trailing or leading end of the rig to overcome the opposing wind and boost rotation.

Swivels (Standard fishing or other type) are used to prevent twisting of the anchor lines. The rig can also be mechanically driven by any device that can rotate the shaft such as a hand crank, battery powered drill, or other motor, in which case the decoys may be perpendicular to the shaft, decoy types other than silhouette type (examples shell or full bodied type decoys) may be used, and balance is not as critical.

DESCRIPTION OF DRAWINGS

FIG. 4 is a side operational view of the rotating diving decoy rig in accordance with the present invention attached to an alternate anchor 110 (in this example a boat), without optional floating decoy 118 tied into the anchor line 112.

FIG. 5 is a side operational view of the rotating diving decoy rig in accordance with the present invention attached to an alternate anchor 110 (in this example a boat), being driven by a manual crank through a cable or shaft 119 and a non-swiveling attachment device 116.

DETAILED DESCRIPTION OF THE PREFERRED EMBODIMENT

Figure 1:
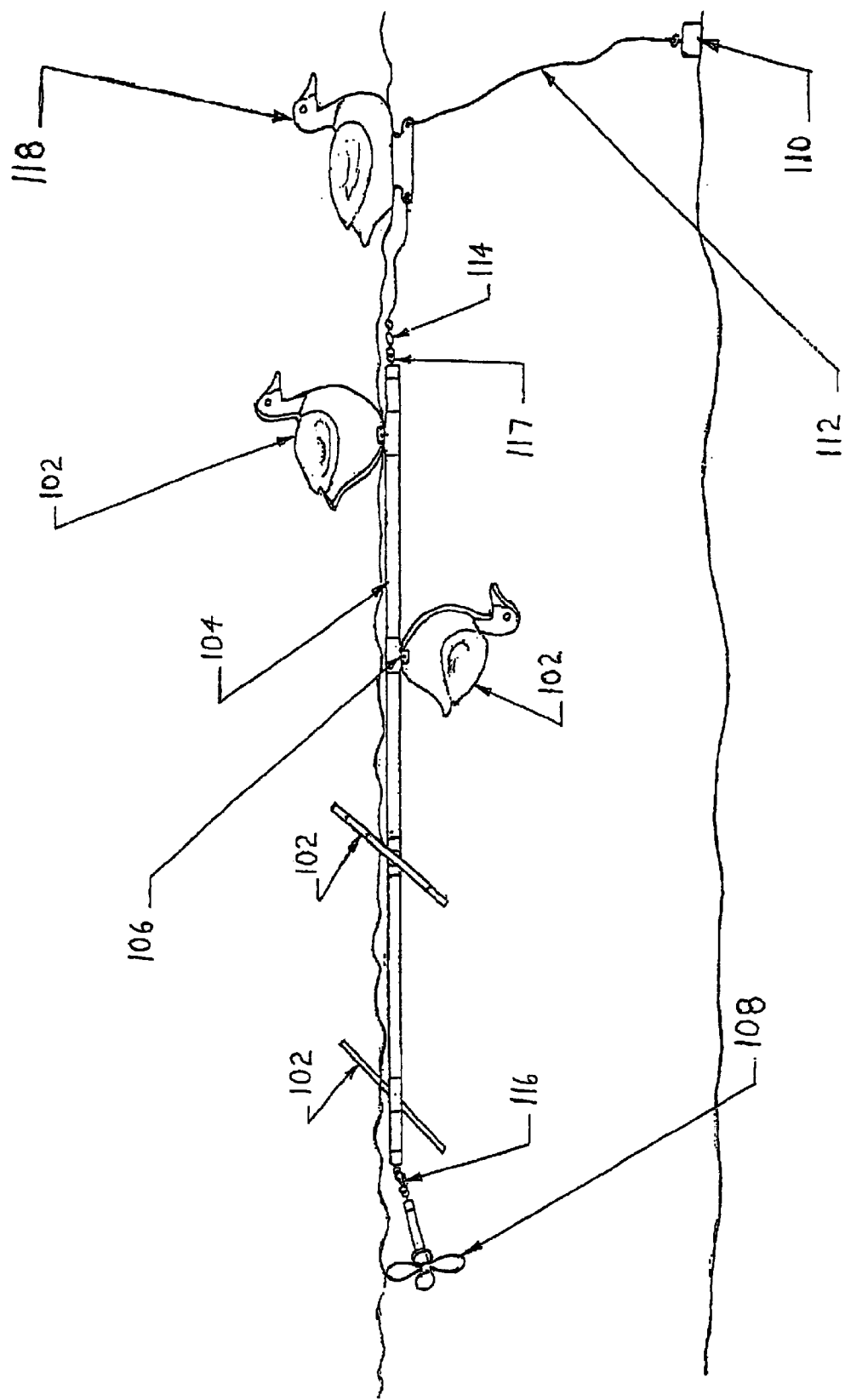
FIG. 1 is a side operational view of the rotating diving decoy rig in accordance with the present invention.
Figure 2:
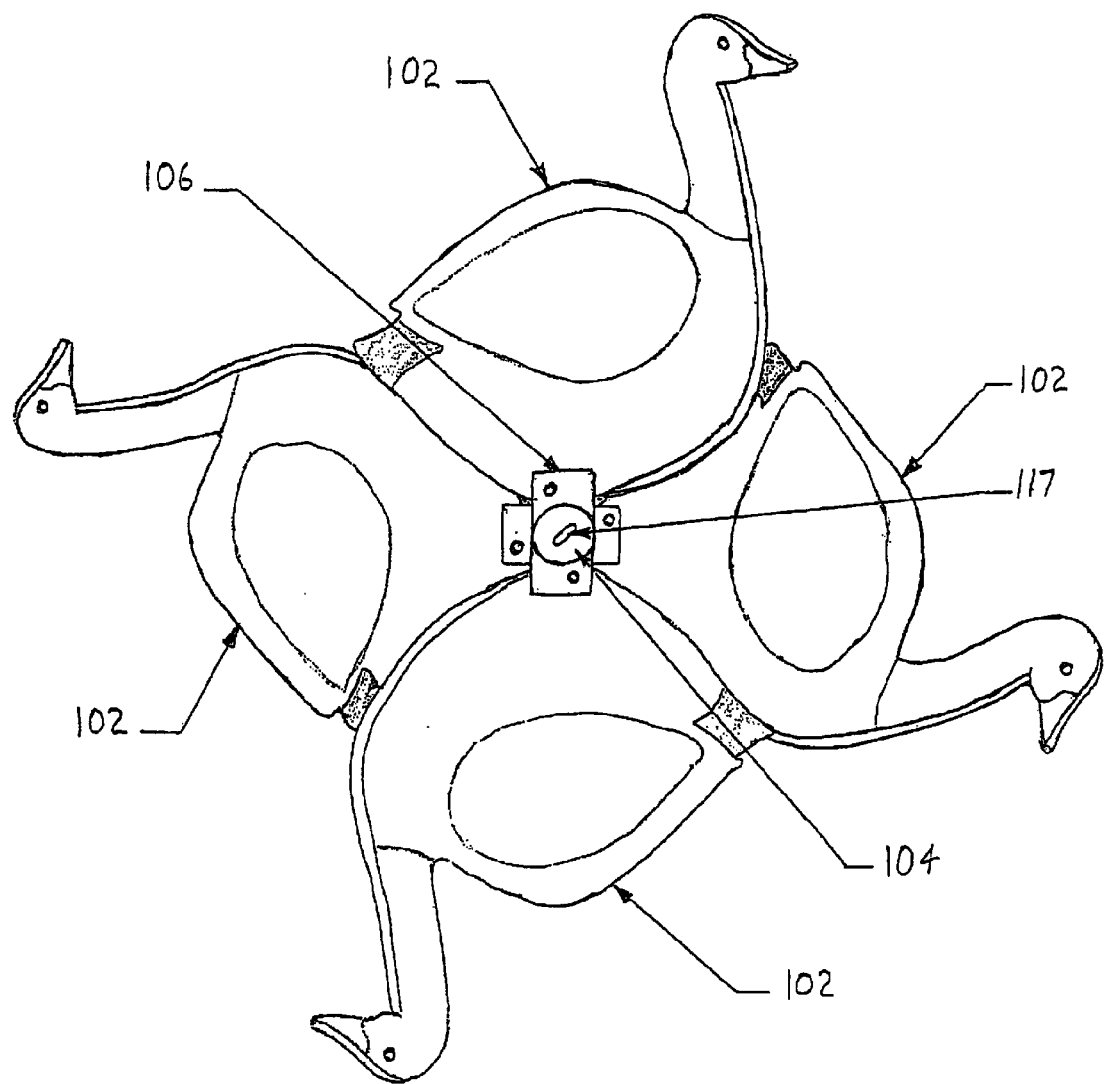
FIG. 2 is a section view of the rotating diving decoy rig shown in FIG. 1.
Figure 3:
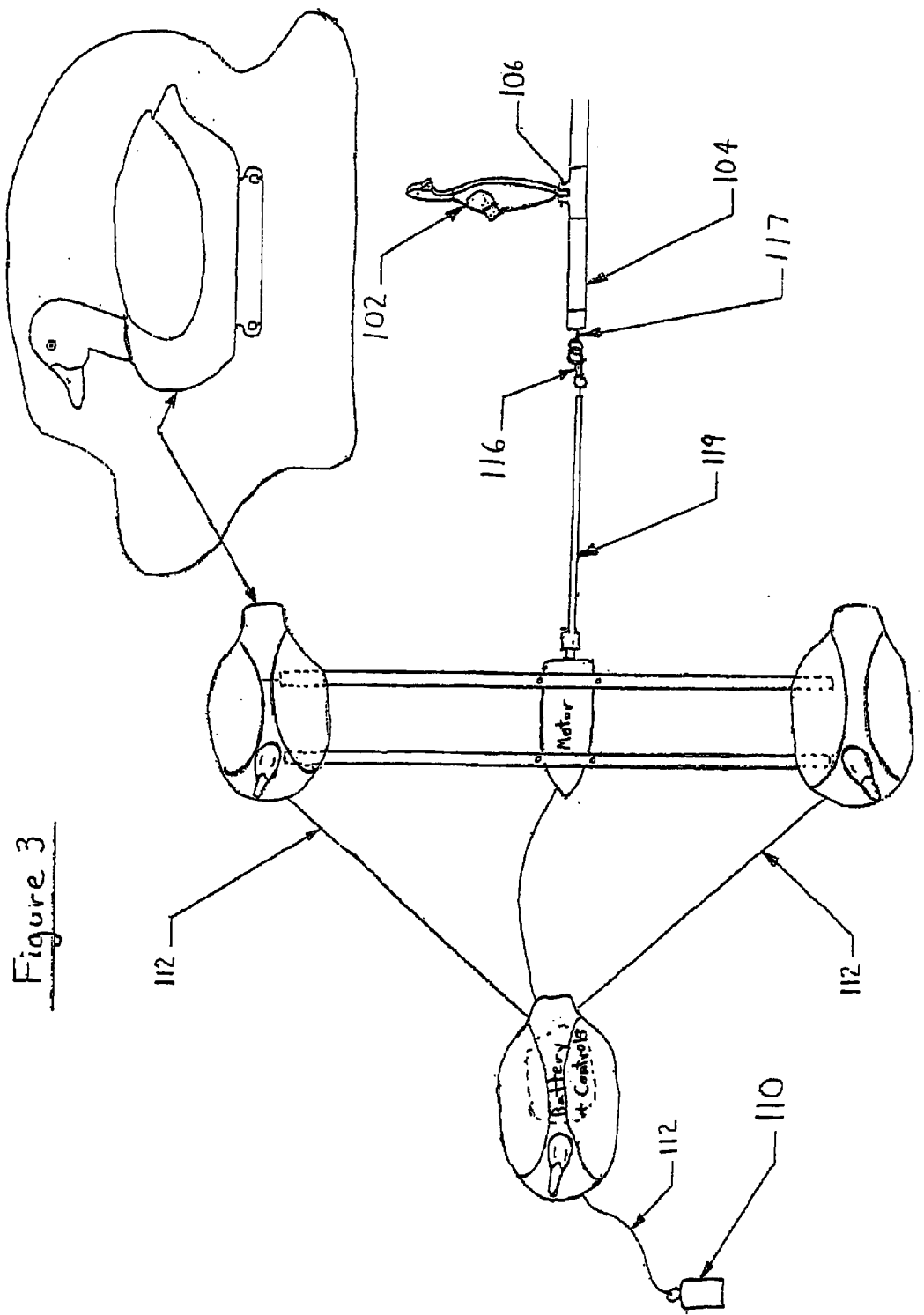
FIG. 3 shows an example of a ways to configure a drive motor to drive the decoy rig 100. There are many other ways to use a motor or crank to turn the rig. The point being that the rig 100 can be driven by the shaft 104 driving the decoys 102 instead of wind or water movement causing the decoys 102 to drive the shaft 104.

Turning first to FIG. 1, there is illustrated a side operational view of the decoy rig 100 in accordance with the present invention. Decoy rig 100 comprises a plurality of individual decoys 102 mechanically coupled to a shaft 104 by a coupling device 106. Preferably, one end of shaft, 104 is connected to a swivel 114 and an anchor by means of an anchor line 112. The other end of the shaft 104 may be connected to a booster propeller 108 as discussed in more detail below.

Decoy rig 100 and individual decoys 102 may simulate any type of live counterpart, other shape or character in accordance with the present invention. The shape of the decoy 102 is not as critical since the diving flashing movement within the spread that primarily attracts passing waterfowl. As shown herein, by means of example only, decoy rig 100 and individual decoys 102 are typically waterfowl, such as geese or ducks. Any number of individual decoys 102 may be comprise decoy rig 100 in accordance with present invention, but the inventor has found that four decoys 102 per decoy rig 100 provides a natural simulation of their live counterparts, while remaining manageable to the user of decoy rig during deployment and use. If more decoys per anchor 110 are desired an additional decoy rig 100 or rigs can easily be attached to the trailing end of the first decoy rig 100.

Whatever, the number, individual decoys 102 should be distributed at regular intervals along shaft 104, as even weight distribution will improve the performance of the present invention. Further, individual decoys 102 are preferably positioned/distributed evenly around the shaft diameter 104 at different orientations, as shown, for example, in FIG. 1. That is, at any given time when in use, some of individual decoys 102 are below the surface of the water, thus simulating the natural diving habits of live waterfowl.

Individual decoys 102 are preferably of the silhouette type but may also be of other known construction, such as full-bodied (solid or hollow) or other designs if the rig powered through the shaft with a motor or manual crank. The cross sectional area of each of individual decoys 102 should be substantially the same. If of the silhouette type, individual decoys 102 may be substantially planar in construction, or may be slightly curved or bowed (i.e., like the sail on a sailboat) to increase the responsiveness (i.e., rotational motion) of the individual decoys 102 to forces from the wind, water current or tide, or other means, also as discussed in more detail below. Individual decoys 102 are preferably constructed of wood, plastic, metal or other suitably lightweight, inexpensive material, as will be apparent to one skilled in the art.

Shaft 104 preferably comprises a buoyant, rigid, inexpensive material, such as plastic, PVC piping, or wood. Shaft 104 may be hollow or solid. If hollow and if perforated such as to accommodate the coupling device 106, attachment eye 117, or non-swiveling attachment device 116, or for other reasons, perforated section of the shaft should be sealed off from floatation sections to prevent water from compromising its buoyancy. This may be done using any of a plurality of known plugs, gaskets, caps, sealants, or the like as will be apparent to those skilled in the art. Perforated/unsealed sections of the shaft 104 should be provided with drain holes to allow water to escape and prevent freeze damage. Further, shaft 104 may be of unitary construction of any comprise a plurality of sections connected, for example, by a hinge or other collapsible or adjustable means such as telescoping pieces (also not shown) to facilitate the storage and handling of decoy rig 100.

The decoy to shaft coupling device 106 is rigidly attached to the shaft 104 setting the location and angle of each decoy 102 in relation to the shaft length and axis. This coupling may be made of plastic, composite, metal or other rigid material. It may also be cast or constructed as an integral part of the shaft.

Preferably the coupling device will be constructed to using a quick disconnect or other fastening device that will allow decoys to be quickly and easily installed and removed by a person wearing gloves using no tools. However any number of fastening schemes such as permanent bonding, various bolts or fasteners, hinges that flip up and lock in etc. (Not shown) may be used to fasten the coupling to the decoy.

Further in accordance with the present invention and shown in FIG. 1, individual decoys 102 are preferably secured to the shaft 104 by the coupling device 106 at an angle to the axis of the shaft similar to the blades of a propeller or turbine in relation to an impeller hub. The particular preferred angle or pitch at which the individual decoys 102 are deployed along the shaft will depend on the various environmental conditions such as water or wind speed in which the decoy rig 100 will be used as will be apparent to those of skill in the art. The angle of the decoys 102 may be set to induce either clockwise or counter clockwise rotation of the decoy rig 100. The angle may also vary if outside force other than flow against the decoy such as a motor or manual crank are used to rotate the shaft.

The present invention may further comprise an optional booster propeller 108 shown in FIG. 1. Propeller 108 may be of a multi-blade known construction, or may use individual decoys 102 as its blades.

The booster propeller 108 would normally be used in conditions where water flow is present, and wind direction is opposing it. Under these conditions the rotation of the diving decoy rig 100 may slow or stop, and the booster propeller 108 or propellers which is generally below the water surface helps the force of the water overcome the wind. In addition to improving the rotation the booster propeller the can act as additional decoys if its tips break the surface of the water. The booster propeller 108 is attached to the trailing or leading end of the decoy rig 100 using a non-swiveling clip or attachment device 116 to allow it transmit rotational force to the decoy rig 100.

Decoy rig 100 is typically secured in place by an anchor line 112 attached to the leading end of the shaft 104 through a swivel 114. The anchor 110 may consist of a weight on the bottom, a boat, piling, or other structure stable enough to hold the decoy rig 100 in place as is well known in the art. FIG. 1 shows an example where an optional standard floating full bodied decoy 118 attached to the anchor line 112 to add to the spread. Additionally the anchor 110 holds the decoy rig 100 in place against the wind and water flow creating a differential pressure across the decoys 102 and causing them to rotate.

If the decoy rig 100 is being driven by an outside force such as a motor or manual crank as shown in FIG. 4 and FIG. 5, the swivel 114 will replaced with a non-swiveling attachment device 116 and the anchor line 112 will be replaced with a line shaft or cable 119 stiff enough to transmit force from the motor or manual crank over its length without twisting. (Example a drain snake cable attached to a motor, or the standard hand crank that is often used to turn the snake when cleaning drain lines.)

When in use, decoy rig 100 is deployed, for example in open water but within shooting distance of the waterfowl blind. The anchor 110 secures the decoy rig 100 and prevents its loss and holds it against water and or air flow. Individual decoys 102 are deployed along shaft 104, preferably at regular intervals along its length and around its diameter to balance the decoy rig 100 so that minimal wind or water movement is required to start and maintain rotation. The shaft 104 floats freely at or near the water surface. As a result at any given time, some of the individual decoys 102 are above the surface of the water while others of individual decoys 102 are below it. As a result of the free floating aspect of the decoy rig 100 it will normally pivot around its anchor 110 keeping it facing into the wind or water flow. Facing the decoy rig 100 into the flow maximizes the differential pressure across the decoys 102 and increases rotational force and speed. Also facing into the flow is a typical habit of waterfowl making the spread look natural. The angle of individual decoys 102 axis in reference to the shaft 104 axis will affect the rotation speed of the decoy rig 100 and can be adjusted based on field conditions. As forces from the wind, water current or tide flow, meet the individual decoys 102, such forces will cause decoy rig 100 to rotate with the shaft 104, thus simulating the natural feeding action of waterfowl. In this regard, the cross-sectional area of each individual decoy 102 acts as a propeller turbine blade or sail. Typically, the stronger such forces of the wind or water flow are, the faster the decoys 102 rotate and dive. The amount of action of individual decoys 102 will also depend on other considerations such as their construction, size, and angles of orientation relative to shaft 104 axis, and whether or not the individual decoys 102 are planar, cupped or contoured similar to propeller or fan blades. Optional Booster propeller 108 may be provided to improve rotation to the decoy rig 100.

The present invention has been described above in the context of its present preferred embodiment. It should be apparent, however, that other variations and modifications may be employed without departing from the spirit or scope thereof. For example, while the various components described above are preferably of a durable construction suitable for exposure to a harsh saltwater environment, such construction may change depending on the actual environment in which the invention is used. Further, while various subcomponents are described to show preferred or critical characteristics there are numerous mechanical fasteners, fittings, etc. that could be substituted to perform their function.

Furthermore although the decoy rig 100 is primarily intended to be driven by water or air flow pushing against the individual decoys 102 on the anchored decoy rig 100, the decoy rig 100 can also be rotated by pulling on the anchor line 112 and dragging the decoy rig 100 through the water. Decoy rig 100 may also be electrically or mechanically driven by any device that can rotate shaft 104, such as a manual hand crank, battery powered drill, trolling motor, including remote controlled devices (not shown). The design of the individual decoys 102 may have many variations such as size, shapes, angle in reference to shaft 104, species of waterfowl, contour of silhouette surface, body position of waterfowl depicted, or even be full bodied or shell designed (if mechanically or electrically driven). The shaft 104 may vary in, material, length, shape i.e. round, square, type of floatation i.e. trapped air, foam floatation, naturally buoyant materials such as wood, etc.

What is claimed is:

1. A floating waterfowl decoy device comprising: A plurality of silhouette waterfowl decoys; said plurality of decoys being mounted to an elongated shaft with said plurality of decoys being spaced longitudinally along the length of the elongated shaft and being spaced around the diameter of the shaft, the silhouette of the decoys being mounted oriented such that the longitudinal axis of the decoys is at an angle of less than 90 degrees to the longitudinal axis of the elongated shaft, the materials of the shaft and the decoys being such that the device floats without any other form of support on the surface of the water and allows for the decoys to rotate in a constant 360 degree clockwise or counter clockwise pattern when force from water or air flow is applied to the surface of the decoys to simulate the diving action of waterfowl due to the location of the plurality of decoys each decoy mounted to the elongated shaft passes totally below the water once per 360 degree revolution of the decoy.

2. The floating waterfowl decoy device of claim 1 further including a propeller attached at either end of the elongated shaft in order to aid in the rotation of the shaft due to water movement against the propelled surface.

3. A floating waterfowl decoy device comprising: A plurality of silhouette waterfowl decoys; said plurality of decoys being mounted to an elongated shaft with said plurality of decoys being spaced longitudinally along the length of the elongated shaft and being spaced around the diameter of the shaft, the silhouette of the decoys being mounted oriented such that the longitudinal axis of the decoys is at an angle of less than or equal to 90 degrees to the longitudinal axis of the elongated shaft, the materials of the shaft and the decoys being such that the device floats without any other form of support on the surface of the water and allows for the decoys to rotate in a constant 360 degree clockwise or counter clockwise pattern when rotational force from a motor is applied to the elongated shaft of the waterfowl decoy device to simulate the diving action of waterfowl due to the location or the plurality of decoys each decoy mounted to the elongated shaft passes totally below the water once per 360 degree revolution of the decoy.

4. A floating waterfowl decoy device comprising: A plurality of silhouette waterfowl decoys; said plurality of decoys being mounted to an elongated shaft with said plurality of decoys being spaced longitudinally along the length of the elongated shaft and being spaced around the diameter of the shaft, the silhouette of the decoys being mounted oriented such that the longitudinal axis of the decoys is at an angle of less than or equal to 90 degrees to the longitudinal axis of the elongated shaft, the materials of the shaft and the decoys being such that the device floats without any other form of support on the surface of the water and allows for the decoys to rotate in a constant 360 degree clockwise or counter clockwise pattern when rotational force from a manual crank is applied to the elongated shaft of the waterfowl decoy device to simulate the diving action of waterfowl due to the location of the plurality of decoys each decoy mounted to the elongated shaft passes totally below the water once per 360 degree revolution of the decoy.

* * * * *